United States Patent [19]
Povalski et al.

[11] 3,724,480
[45] Apr. 3, 1973

[54] PRESSURE COMPENSATED MIXING VALVE

[75] Inventors: Eugene A. Povalski; Edwin F. Bolgert, both of Kohler, Wis.

[73] Assignee: Kohler Co., Kohler, Wis.

[22] Filed: Nov. 19, 1971

[21] Appl. No.: 200,435

[52] U.S. Cl. ................................. 137/98, 137/607
[51] Int. Cl. ................................................ F16k 19/00
[58] Field of Search ................ 137/98, 100, 114, 607

[56] References Cited

UNITED STATES PATENTS

| | | | |
|---|---|---|---|
| 2,417,158 | 3/1947 | Fraser | 137/100 |
| 3,182,677 | 5/1965 | Thiem | 137/98 |
| 3,688,790 | 9/1972 | Esten | 137/98 |

*Primary Examiner*—Robert G. Nilson
*Attorney*—Allan W. Leiser et al.

[57] ABSTRACT

A pressure compensated mixing valve includes a diaphragm actuated compensating valve and a double spool type mixing valve. The mixing valve spools extend into hot and cold inlet sections and are arranged to seal with supply pressure. The two valves are in separate cartridges removably disposed in a valve body; and the cartridges are spaced from the body to define a mixing chamber, which allows the main supply and outlet passages to be at the same end of the valve. Two washers serve as sealing seats for the spools and also as seals between the cartridges, and are trapped by the heads on the spools to prevent loss during assembly or disassembly.

4 Claims, 9 Drawing Figures

PATENTED APR 3 1973

INVENTORS
EUGENE A. POVALSKI
EDWIN F. BOLGERT

BY Allan W. Leiser

ATTORNEY

PRESSURE COMPENSATED MIXING VALVE

BACKGROUND OF THE INVENTION

This invention relates to pressure compensated mixing valves, and more particularly to an improved valve including a diaphragm actuated compensating valve and a double spool mixing valve. The type of valve contemplated is particularly suited for, but not limited to, tub-shower installations or similar applications.

Double spool mixing valves of the general type contemplated herein are shown, for example, in U.S. Pat. Nos. 1,001,431 and 1,669,772. In such valves, there are hot and cold outlets controlled by parallel, simultaneously movable spools provided with offset, overlapping flow grooves. As the spools are moved simultaneously from a closed position, one groove comes into play first, then both grooves are effective, and finally only the other groove is operable. The spools are usually moved by means of a rotatable stem, and by rotating the stem the user can select between cold, temperate, or hot flow. While such valves are generally satisfactory, prior arrangements have been deficient in that the spools must be closed against supply pressure, which is considerably less desirable than having them close with pressure.

It is desirable for this or any other type of mixing valve to provide for pressure compensation to guard against undesirable or even dangerous temperature fluctuations caused by variations in hot or cold supply pressures. Diaphragm actuated arrangements are particularly suitable for this purpose, and one such arrangement is shown in U.S. Pat. No. 3,469,595. Reference may also be had to U.S. Pat. Nos. 2,470,025 and 2,417,158.

To be commercially acceptable, a pressure compensated mixing valve must be efficient and durable while still being relatively simple, inexpensive and easy to assemble and maintain. Notwithstanding the available prior knowledge and extensive past efforts, no presently known valve fulfills all of these requirements as well as that contemplated by this invention.

SUMMARY OF THE INVENTION

It is the general object of this invention to provide a pressure compensated mixing valve which is highly efficient, sturdy and long wearing, and relatively simple and inexpensive to manufacture, assemble and maintain.

It is one specific object of the invention to provide an assembly including a double spool mixing valve in which the valve spools close with supply pressure. Another specific object is to provide a valve in which compensating and mixing elements are enclosed in separate cartridges disposed within a valve body, with a single pair of washers serving as seals for the mixing valve elements and also as seals between the two cartridges, the washers being trapped to prevent loss. Still another specific object is to provide an arrangement in which there is sufficient spacing between the cartridges and body to serve as a mixing chamber, as the result of which both the supply passages and the outlet for the valve can be at one end, which makes the valve particularly suitable for conventional home tub-shower installations. Still another specific object is to provide a two-part valve body with the cartridges disposed in respective parts to greatly simplify assembly and disassembly.

Further general and specific objects and advantages will appear from the description to follow.

DESCRIPTION OF THE PREFERRED EMBODIMENT

Figure 1:
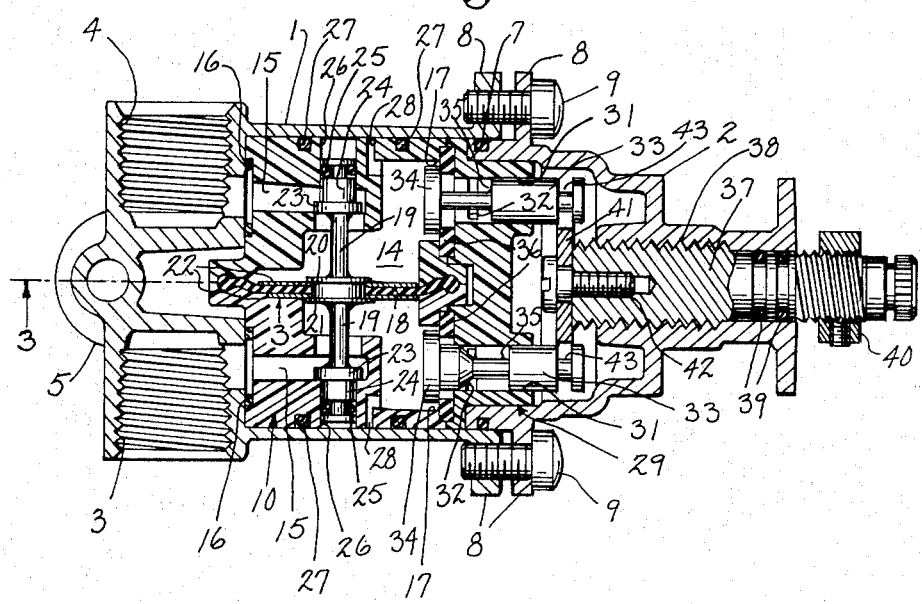
FIG. 1 is a view in cross section showing a pressure compensated mixing valve constituting a preferred embodiment of the invention.
Figure 2:
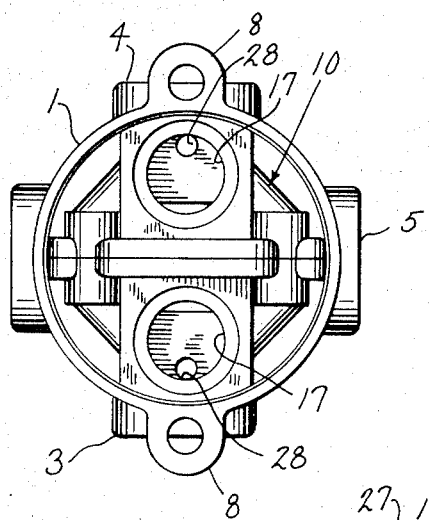
FIG. 2 is a view in elevation looking into the open end of the inner portion of the body of the valve of FIG. 1 and showing a pressure compensating cartridge in place.

The valve shown in the drawings includes an essentially enclosed metal body made up of a first or inner part 1 and a second or outer part 2. The inner or left hand end of the part 1 as seen in FIG. 1 is essentially closed and defines opposite hot and cold supply passages 3 and 4 for connection to water supply conduits (not shown). As can be seen most clearly in FIG. 3, the inner end of the part 1 also defines an outlet passage 5 which extends across the part 1 transversely to the passages 3 and 4 and communicates with the interior of the part 1 through an opening 6. The preferred embodiment is designed for use in a tub-shower installation, and thus both ends of the passage 5 are threaded for connection to tub and shower conduits (not shown). The valve might, however, be made to supply one or more lines depending upon the desired use. As will be discussed more fully below, it is a particular advantage of the preferred embodiment that the outlet passage 5 and supply passages 3 and 4 are both at the inner end of the valve body, since this part can then be mounted and all necessary connections made within a normal building wall space.

The outer or right hand end of the part 1 as seen in FIG. 1 is open, and receives the open inner or left hand end of the part 2, the two body parts thus mating to define an enclosed body. The open end of the part 2 actually extends into the open end of the part 1 to define a skirt which serves a purpose to be described, and an O-ring 7 in a groove on the outer surface of the skirt portion provides a seal between the parts 1 and 2. The parts 1 and 2 are provided with opposite, aligned ears 8, and are removably assembled by means of bolts 9 engaged with the ears.

Figure 3:
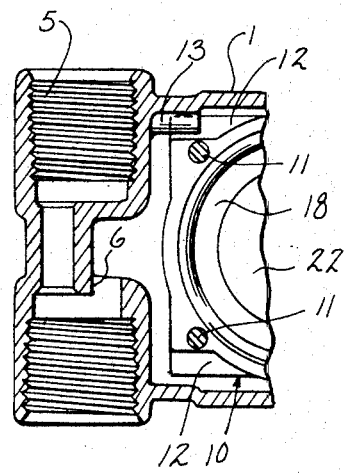
FIG. 3 is a fragmentary view in cross section taken through the plane 3—3 shown in FIG. 1.
Figure 4:
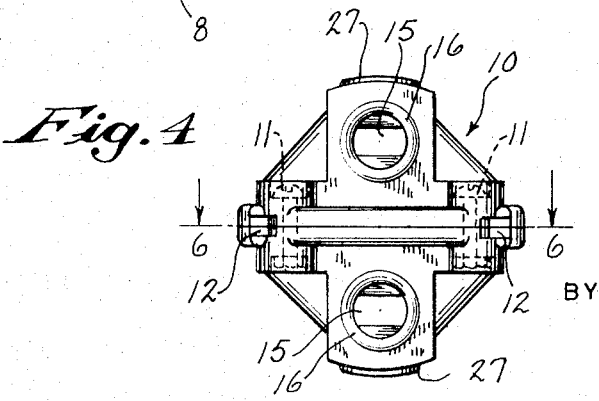
FIG. 4 is a view in elevation showing the inner end of the pressure compensating cartridge seen in FIG. 2.
Figure 5:
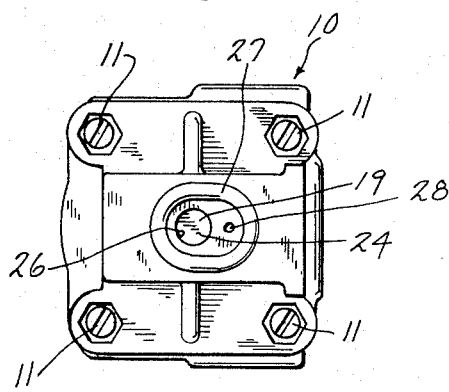
FIG. 5 is a side view in elevation of compensating cartridge of FIG. 4.
Figure 6:
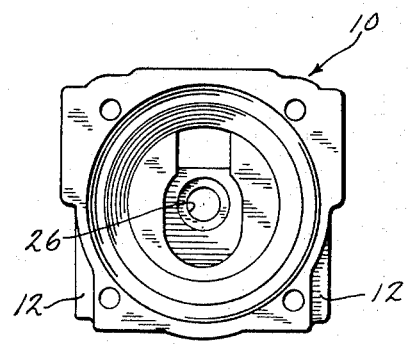
FIG. 6 is a view in cross section through the plane 6—6 shown in FIG. 4.

Disposed within the body part 1 is a pressure compensating cartridge which is designated generally by the reference numeral 10 and which is seen clearly in FIGS. 2, 4, 5 and 6. The cartridge 10, which is preferably formed of a suitable plastic material, is essentially cross shaped in cross section, and is made up of two mirror halves removably held together by screw and nut assemblies 11. The inner end, to the left as seen in FIG. 3, of the cartridge 10 is provided with opposite notches 12, and one of these must mate with a small rib 13 formed in the body part 1 before the cartridge 10 can be fully inserted, thus assuring that it will be in the proper orientation.

The cartridge 10 defines a central, symmetrical inlet chamber 14 and a pair of opposite inlet passages 15 each of which communicates with and leads from a respective supply passage 3 or 4 and thence turns inwardly so that the two passages 15 are aligned with and face one another across the inlet chamber 14. The lower passage 15 as seen in FIG. 1 is in communication with the passage 3 and thus serves as a hot inlet passage, while the upper passage 15 serves as a cold inlet passage. O-rings 16 surround the outer or upstream ends of the passages 15 and sealingly bear against the body part 1. Opposite, coplanar outlet openings 17 lead outwardly from the chamber 14.

Disposed transversely across the chamber 14 between and in alignment with the inlet passages 15 is a flexible diaphragm 18 which has a beaded periphery clamped between the parts of the cartridge 10. The diaphragm is of a suitable, impervious rubber or other elastic material, and effectively divides the inlet chamber 14 into two sections, a hot section which is toward the bottom as seen in FIg. 1 and a cold section which is toward the top, and one of the openings 17 leads from each section.

A compensating valve means in the form of a spool 19 is aligned with the inlet passages 15 and extends through the diaphragm 18 toward each passage. An enlarged central portion of the spool 19 is affixed to the diaphragm by means of an integral flange 20 and a retainer ring 21 which bear against opposite surfaces of the diaphragm 18. Preferably, circular metal protective discs 22 are interposed between the flange 20 and ring 21 and the respective diaphragm surfaces.

The outer ends of the spool 19 are shaped to define annular valve portions in the form of lands 23 which can enter and fill the inwardly turned portions of the inlet passages 15 on their upstream sides to control flow therethrough in a manner that will be described. Beyond the valves 23, the spool 19 has cylindrical guide portions 24 which are provided with sealing O-rings 25 and which are reciprocably guidingly slidable in corresponding guide openings 26 which extend entirely through the opposite walls of the cartridge 10. Oval-shaped areas surrounding the openings 26 on the outer surfaces of the cartridge 10 are circumscribed by O-rings 27 which are sealingly compressed between the cartridge 10 and the interior surface of the body part 1 when the cartridge 10 is in place. Small bleeder openings 28 afford communication between the inlet chamber 14 and the areas circumscribed by the O-rings 27. The arrangement of having the openings 26 extending through the cartridge wall operates, in conjunction with the bleeder openings 28, to equalize the pressure on each end of the spool 19 with that in the respective sections of the chamber 14, thus insuring that pressure differentials are reflected across the entire surface area of the diaphragm 18.

As seen in FIG. 1, the diaphragm 18 is shown in one extreme position in which it is toward the lower passage 15, the lower passage 15 thus being fully open while the upper passage 15 is fully closed. This is a position that is assumed only in the event of an effectively complete loss of pressure in the lower inlet chamber section, and the diaphragm 18 can move to an opposite extreme position in which it is toward the upper passage 15, thus completely shutting off the lower passage 15. Having the diaphragm 18 movable to these extreme positions is an important safety feature in that a complete failure in either supply line will result in flow from the other line being cut off, thus preventing an undesired discharge of only hot or only cold water. The diaphragm 18 is preferably made large enough so that it can move to either extreme position without substantial stretching of the diaphragm material, thus assuring quick and efficient action.

Under normal conditions, the diaphragm 18 will assume an intermediate position in which both passages 15 are open to about the same extent. In the event of a relative pressure increase on either side, however, it will move away from the higher pressure and thus at least partially close the associated passage 15. As a result, the output flow remains substantially constantly at the temperature selected by the user. Again, should there be a substantially complete failure on one side, for example on the hot side as seen in FIG. 1, the diaphragm 18 will move to an extreme position where the other side is shut off.

Figure 7:
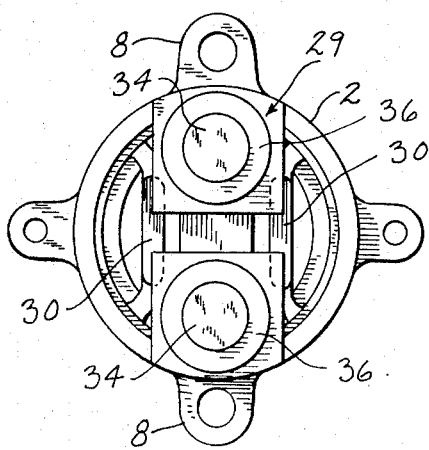
FIG. 7 is a view in elevation showing the open inner end of the outer part of the body of the valve of FIG. 1 with a mixing cartridge in place.
Figure 8:
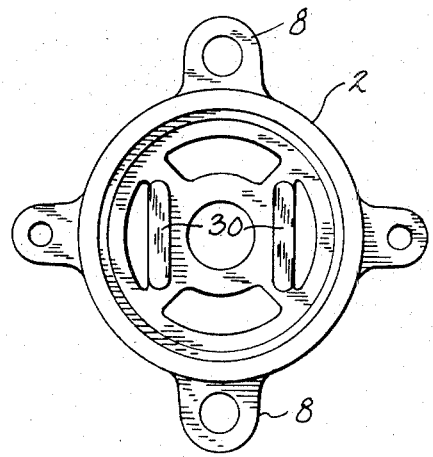
FIG. 8 is a view similar to FIG. 7 but with the mixing cartridge removed.
Figure 9:
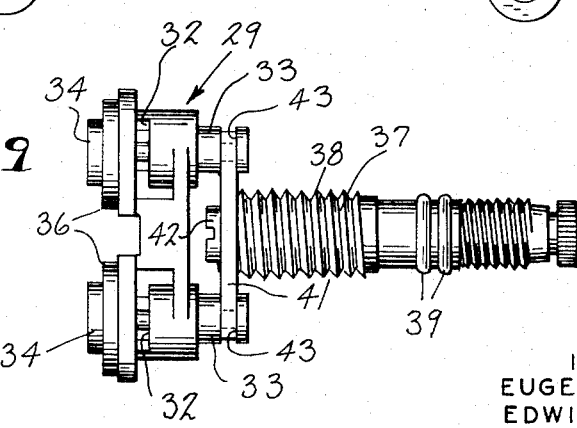
FIG. 9 is a view in elevation of the mixing cartridge and its operating stem.

A mixing cartridge, preferably molded of a plastic material, is indicated generally by the reference numeral 29 and is seen in FIGS. 1, 7 and 9. The cartridge 29 is removably disposed in the outer body portion 2, and is held against rotation therein by upstanding arms 30 formed integrally with the body portion 2.

The cartridge 29 defines opposite, parallel bores 31 which have upstream ends aligned with the openings 17 when the cartridge 29 is in place. Downstream exit openings 32 lead laterally from the bores 31 outwardly through the cartridge 29. The bores 31 and openings 17 together define hot and cold outlets leading, respectively, from the hot and cold sections of the inlet chamber 14. Water allowed to pass through the bores 31 moves outwardly through the openings 32 and thence to the outlet openings 6 and outlet passages 5. The cartridges 10 and 29 are shaped so that they are spaced from the body portions 1 and 2 in at least some areas to allow such flow, these spaces serving as a mixing chamber for hot and cold water.

Reciprocally slidable within each bore 31 is a cylindrical mixing valve spool 33. The bodies of the spool 33 substantially fill the bores 31, and each spool 33 is provided at its inner end with a radially enlarged head 34 which is radially larger than the bore 31 but smaller than the outlet openings 17, the heads 34 extending into respective sections of the chamber 14 when the parts are assembled as can be seen in FIG. 1. The spools 33 are provided with axially elongated flow grooves 35 intermediate their ends, which allow flow from the upstream ends of the bores 31 to the outlets 32 over a selected operating range as will be described. As can be seen most clearly in FIG. 1, the two grooves 35 are axially offset from one another and overlap to a significant extent.

The outer surface of the cartridge 29 is recessed around the upstream end of each bore 31 to receive a circular disc sealing washer 36 which has a central opening of about the same size as the bore 31 but smaller radially than the head 34. The washers 36 relatively closely surround the spools 33 immediately downstream of the heads 34, and are effectively trapped between the heads 34 and the outer surface of the cartridge 29. The washers 36 extend radially outwardly of the heads 34 to define peripheral portions which extend completely around the openings 17 and heads 34 and which are received in recesses formed on the outer surface of the pressure compensating cartridge 10, the washers 36 thus also serving as seals between the cartridges 10 and 29. As can be seen in FIG. 1, the inwardly extending skirt on the open end of the body portion 2 bears against an outer portion of the cartridge 29, this engagement serving to compress the washers 36 between the two cartridges.

The spools 33 are moved simultaneously by means of a stem 37 which is threadedly engaged with the housing part 2 at 38. The stem 37 extends outwardly through the outer end of the housing part 2, and is provided with two O-rings 39 which provide a seal. That portion of the stem 37 which extends beyond the housing part 2 is provided with a knurled end to receive an operating handle (not shown) and is threaded to receive a lock nut 40. The outer portion of the stem 37 is of small enough diameter so that the entire stem can be inserted into and removed from the housing part 2 from the left as seen in FIG. 1.

A yoke 41 is relatively loosely fixed on the inner end of the stem 37 by a screw 42. The outer ends of the yoke 41 are notched and are engageable with annular grooves 43 in the outer ends of the spools 33, as the result of which the spools 33 will be moved axially in response to axial movement of the stem 37 effected by rotation thereof.

In FIG. 1, the mixing elements are shown in a closed position, in which the spools 33 are fully retracted or moved to the right. In this position, the heads 34 bear tightly against the washers 36 so that the upstream ends of the bores 31 are completely sealed off. When the stem 37 is manually rotated, the spools 33 will simultaneously extend to the left toward the chamber 14. At the very beginning of this movement, the groove 35 of the upper spool 33, which is the cold spool in this embodiment, will come into play and allow water to move from the cold section of the chamber 14 into the upper bore 31 and out through the opening 32 and thence to the outlet 5. At this point, however, the lower bore 31 will still be sealed off because the groove 35 of the lower spool 33 will not yet have been moved to the upstream end of the associated bore 31. As the spools 33 move further to the left, the lower groove 35 will come into play, and at this point hot water will be allowed to move to the outlet passage 5. Since the two grooves overlap, the cold groove 35 will remain effective during the initial period of effectiveness of the hot groove 35. As movement continues further, however, the cold groove 35 will be moved completely past the associated outlet 32, whereupon only the hot groove will be effective. Reverse rotation of the stem 37 will cause the spools 33 to be retracted simultaneously to the right, as the result of which the hot groove 35 will be shut off first, then the cold groove 35 is shut off, and finally the upstream ends of both passages 31 are sealed off. Thus, by rotation of the stem 37 the user is enabled to select between cold, temperate or hot flow. The operating ranges of the spools 33 is determined by the axial lengths and positioning of the grooves 35 which can easily be selected for any particular application.

While double spool valves are known per se, a particularly important and novel feature of the arrangement shown herein is that the spools close, i.e. retract, with the supply pressure in the chamber 14, as opposed to earlier arrangements in which the spools have had to be closed against pressure. This provides for far more effective closing and consequently improved overall operation.

Another particularly advantageous feature is the provision of the enlarged spool heads 34 and washers 36, in which the washers serve as seats for the heads 34 and also as seals between the cartridges 10 and 29. The washers 36 are trapped in place by the heads 34, and thus the two housing parts can be assembled and disassembled without fear of losing the washers 36. Having the cartridges 10 and 29 in the housing parts 1 and 2 also provides for easy assembly, disassembly and replacement, and having the cartridges spaced from the interior surface of the housing allows the housing itself to serve as a mixing chamber. Water passed through the bores 31 moves back to the inner end of the housing, so that both the supply passages and outlet passages can be at the same end for mounting in a building wall.

While the embodiment shown and described is particularly preferred, it will be obvious that modifications might be made without departure from the spirit of the invention. Other compensating arrangements might, for example, be used in combination with the mixing arrangement shown. In view of this and other possible modifications, the invention is not intended to be limited by the showing or description herein, or in any other manner, except insofar as may specifically be required.

We claim:

1. A pressure-compensated mixing valve of the type having a housing defining and inlet chamber, hot and cold inlet passages leading to the inlet chamber, diaphragm means that extends across the inlet chamber between the inlet passages to divide the inlet chamber into hot and cold sections and that is movable toward and away from the inlet passages in response to pressure differentials in the sections, compensating valve means connected to the diaphragm and operable to control flow through the inlet passages in response to movement of the diaphragm, hot and cold outlets leading respectively from the hot and cold sections, and mixing valve means operable to control flow through the outlets, characterized in that:

the outlets comprise parallel bores having upstream ends leading from respective inlet chamber sections and downstream exit openings; and the mixing valve means comprises a pair of spools, there being one spool in each bore which substantially fills the bore and is axially extensible toward and retractible from the associated inlet chamber section, the spools each being provided with an intermediate, axially elongated groove which affords communication between the upstream and the exit opening when the spool is extended to a point in a selected operating range, the grooves of the two spools being axially offset and overlapping, each spool having an upstream end with a radially enlarged head that is in the associated inlet chamber section and that is radially larger than the bore to serve to seal off the upstream end of the bore when the spool is fully retracted; and there is an operating means to effect simultaneous axial movement of the spools.

2. A valve according to claim 1 further characterized in that: the housing comprises a body that defines hot and cold supply passages; and there is a compensating cartridge that encloses and carries the diaphragm means and the compensating valve means and that defines the inlet passages and the inlet chamber and a pair of outlet openings, leading from respective sections of the inlet chamber, the mixing cartridge being removably disposed in the body with the inlet passages in alignment with respective supply passages; and there is a mixing cartridge that defines the bores and carries the spools, the mixing cartridge being removably disposed in the body with the bores in alignment with the outlet openings.

3. A valve according to claim 2 further characterized in that: there is a resilient sealing washer relatively closely surrounding the upstream end of each spool that is trapped between the head and the mixing cartridge, the washer being pressed between the head and mixing chamber to completely seal off the upstream end of the bore when the spool is fully retracted, the washer being radially larger than the head and the associated outlet opening to define a peripheral portion extending completely around the head and outlet opening that serves as a seal between the mixing and compensating cartridges.

4. A valve according to claim 3 further characterized in that: the valve body comprises a first part having a closed inner end which defines the supply passages and an outlet passage and an open outer end, and a second part removably attached to the first part and having a closed outer end and an open inner end that mates with the outer end of the first part; and the compensating cartridge and the mixing cartridge are, respectively, in the first and second body parts, the two cartridges being at least partially spaced inwardly from the interior of the body to define a mixing chamber leading from the exit openings of the bores to the outlet passage; and the operating means comprises a stem that extends through the outer end of the second body part.

* * * * *

PO-1050
(5/69)

UNITED STATES PATENT OFFICE
CERTIFICATE OF CORRECTION

Patent No. 3,724,480            Dated April 3, 1973

Inventor(s) Eugene A. Povalski and Edwin F. Bolgert

It is certified that error appears in the above-identified patent and that said Letters Patent are hereby corrected as shown below:

Column 2, line 17,   after "of" -- the -- should appear

Column 6, line 46,   "and", 1st occ. should read -- an --.

Column 7, line 1,    before "and" -- end -- should appear

Signed and sealed this 28th day of August 1973.

(SEAL)
Attest:

EDWARD M. FLETCHER, JR.
Attesting Officer

RENE D. TEGTMEYER
Acting Commissioner of Patents